Patented May 16, 1939

2,158,107

UNITED STATES PATENT OFFICE 2,158,107

ESTERS OF GLYCOL AND ACYLATED HYDROXY ACIDS

Thomas F. Carruthers, South Charleston, and Charles M. Blair, Charleston, W. Va., assignors to Carbide and Carbon Chemicals Corporation, a corporation of New York No Drawing. Application March 7, 1936, Serial No. 67,676

11 Claims. (Cl. 260—484)

The invention relates to new chemical compounds comprising esterification products of a glycol and an acylated hydroxy acid. It has particular reference to ester compositions which may be formed by the reaction of an alkylene or polyalkylene glycol and a hydroxy monobasic acid, followed by acylation of the hydroxy acid with an aliphatic or aromatic monocarboxylic acid, its anhydride, or other acylating agent.

These new esters are slightly viscous liquids, of substantially no color, having relatively high-boiling points and other characteristics which especially adapt them for use as solvents and plasticizers in lacquers and plastic compositions employing nitrocellulose, other cellulose derivatives, or natural and synthetic gums and resins.

The method of preparation will be further descriptive of the nature of these esters, and comprises preferably two separate successive reactions. A glycol or polyglycol is first reacted with a hydroxy monocarboxylic acid in the presence of a suitable catalyst, whereby esterification of both the hydroxyl groups of the glycol is effected. The resulting product is then acylated with an aliphatic or aromatic monocarboxylic acid, or equivalent acylating agents, to form a completely esterified and stable mixed ester composition.

Hydroxy carboxylic acids containing one or more hydroxyl groups, and which are monobasic in character are suitable in this reaction. These include such acids as lactic, glycollic, glyceric, and similar aliphatic derivatives, as well as salicyclic, hydroxynaphthoic, and the like, of aromatic origin. Both the alkylene and polyalkylene glycols have been used, representative of which are ethylene glycol, propylene glycol, butylene glycol, and the diglycol, triglycol and higher polyglycol derivatives of these compounds. For the final acylation, formic, acetic, propionic, butyric, and other aliphatic monocarboxylic acids, or their anhydrides, may be used. Aromatic monobasic acids, such as benzoic and napthoic acids, are equally suitable, and acylating agents other than carboxylic compounds may be used. For example, acyl halides, including acetyl chloride and benzoyl chloride, or metallic salts of monobasic acids may be employed in accordance with methods customary in the art.

Specific ester compositions embodied by the invention, and their method of preparation are shown in the following examples:

Example I

Triethylene glycol in an amount of 750 grams (5 mols) was heated with 1059 grams (10 mols) of 85% lactic acid, in the presence of about 1.0% of anhydrous aluminum sulfate. Benzene was used to remove the water formed, and the reaction temperature was maintained at 80° to 101° C. The resulting triethylene glycol dilactate was then further heated to a temperature of 150° C. for one hour with 1700 grams (10.9 mols) of butyric anhydride. Excess butyric acid and anhydride were removed from the reaction product by distillation. It was then neutralized with sodium carbonate solution, washed with water, dried by heating under vacuum, and finally distilled under reduced pressure. The final product was a colorless, slightly viscous liquid of a faint odor, having a specific gravity of 1.089 at 20°/20° C., a saponification equivalent of 107.9, and a boiling point of 202° to 203° C. at 2 mm. pressure. The ester may be called triethylene glycol di-(butyryl lactate).

Example II

In a similar procedure to the above, 62 grams (1 mol) of ethylene glycol was reacted with 152 grams (2 mols) of glycollic acid. The resulting ethylene glycol diglycollate was then further esterified with 210 grams (2.06 mols) of acetic anhydride. The temperature of the reaction in the first step was 88° to 101° C. and in the second reaction 90° to 100° C. The final reaction product was recovered in the manner of Example I, and also was a colorless, slightly viscous liquid of very faint odor. It had a specific gravity of 1.254 at 20°/20° C., a boiling point of 128° to 130° C. at 2 mm. pressure, and a saponification equivalent of 66.3. This ester compound may be called ethylene glycol di-(acetyl glycollate).

Example III

Triethylene glycol in an amount of 600 grams (4 mols) was reacted with 608 grams (8 mols) of glycollic acid, and final esterification then effected with 1300 grams (8.3 mols) of butyric anhydride. The reaction temperature was 88° to 98° C. for the first step, and 110° C. for the second. The procedure and recovery of the final product was as described in the above two examples. This ester was again a slightly viscous liquid, substantially colorless, and with a very faint odor. It had a specific gravity of 1.130 at 20°/20° C., a boiling point of 191° to 192° C. at 2 mm. pressure, and a saponification value of 103.7. The compound may be called triethylene glycol di-(butyryl glycollate).

Example IV

Five hundred thirty grams (5 mols) of diethylene glycol were reacted with 760 grams (10 mols) of glycollic acid in the presence of 13 grams (1%) of aluminum sulfate as an esterification catalyst. Benzene was employed to remove the water formed during this reaction, and heating was carried out for a period of about 7 hours at a temperature of 88° C. When approximately the theoretical quantity of water had been removed from the reacting mixture, the product was recovered by filtering out the aluminum salt, and distilling off the benzene. The primary ester, diethylene glycol diglycollate, was then reacted with benzoyl chloride in the proportions of 780 grams (3.5 mols) of the ester and 900 grams (6.4 mols) of benzoyl chloride. The reaction was conducted at 75° C. in the presence of ethylene dichloride as a reaction medium.

The final reaction product was agitated with sodium carbonate solution to neutralize it, washed with water, and freed from ethylene dichloride and water by distillation. The ester was a viscous liquid, insoluble in water, but soluble in benzene, having a specific gravity of 1.276 at 20°/20° C., and having a saponification equivalent of 103.1. This ester may be called diethylene glycol di-(benzoyl glycollate).

These examples are representative of the general class of ester compounds to which the invention applies. Modification in the particular esterification procedure, as shown, may be made, to adapt the process to other reactants of similar nature. For the final acylation step, an acid, as well as the anhydride, is suitable, and both are intended to be included where monocarboxylic acids are called for in the appended claims.

We claim:

1. As chemical compounds, esters of glycols of the group consisting of alkylene and polyalkylene glycols, in which both hydroxyl groups of the glycol are replaced by a radical of a hydroxy monocarboxylic acid acylated with a nonhydroxy monocarboxylic acid radical.

2. As chemical compounds, esters of glycols of the group consisting of alkylene and polyalkylene glycols, in which both hydroxy groups of the glycol are replaced by a radical of a hydroxy monocarboxylic acid acylated with a nonhydroxy aliphatic monocarboxylic acid radical.

3. As chemical compounds, esters of ethylene glycol, in which both hydroxyl groups are replaced by a radical of a hydroxy monocarboxylic acid acylated with a nonhydroxy monocarboxylic acid radical.

4. As chemical compounds, esters of polyethylene glycol, in which both hydroxyl groups are replaced by a radical of a hydroxy monocarboxylic acid acylated with a nonhydroxy monocarboxylic acid radical.

5. As chemical compounds, esters of glycols of the group consisting of alkylene and polyalkylene glycols, in which both hydroxyl groups of the glycol are replaced by a lactic acid radical acylated with a non-hydroxy monocarboxylic acid.

6. As chemical compounds, esters of glycols of the group consisting of alkylene and polyalkylene glycols, in which both hydroxyl groups of the glycol are replaced by a glycollic acid radical acylated with a non-hydroxymonocarboxylic acid.

7. As a chemical compound, an ester of ethylene glycol, in which both hydroxyl groups of the glycol are replaced by a glycollic acid radical acylated with acetic acid.

8. As a chemical compound, an ester of triethylene glycol, in which both hydroxy groups of the glycol are replaced by a glycollic acid radical acylated with butyric acid.

9. As a chemical compound, an ester of triethylene glycol, in which both hydroxyl groups of the glycol are replaced by a lactic acid radical acylated with butyric acid.

10. Process for making esterification products which comprises reacting a glycol of the group consisting of alkylene and polyalkylene glycols, with a hydroxy monocarboxylic acid, and subsequently replacing at least one hydroxyl group of the hydroxy acid with a non-hydroxy monocarboxylic acid radical.

11. Process for making esterification products which comprises reacting a glycol of the group consisting of alkylene and polyalkylene glycols, with a hydroxy monocarboxylic acid in the presence of an esterification catalyst, and subsequently reacting the product with a nonhydroxy monocarboxylic acylating agent.

THOMAS F. CARRUTHERS.
CHARLES M. BLAIR.